March 1, 1949. M. DANN 2,463,455
PUNCH FOR SEMISOLID MEDIA
Filed Nov. 21, 1946
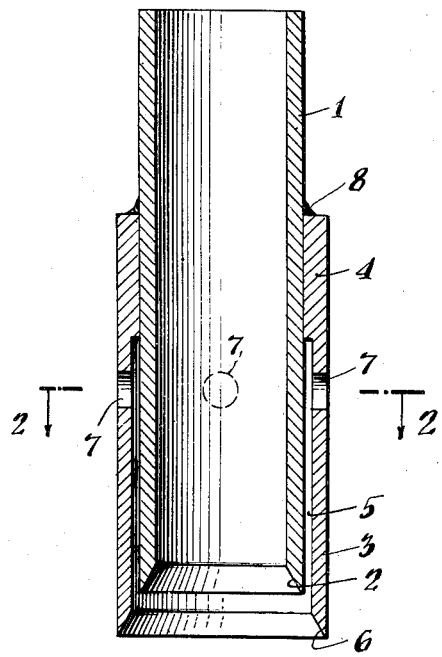
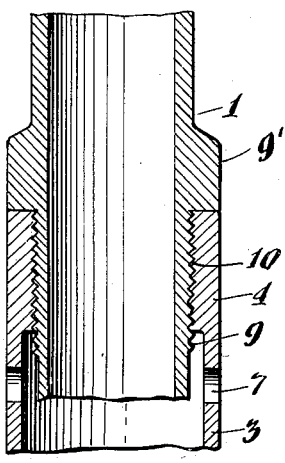
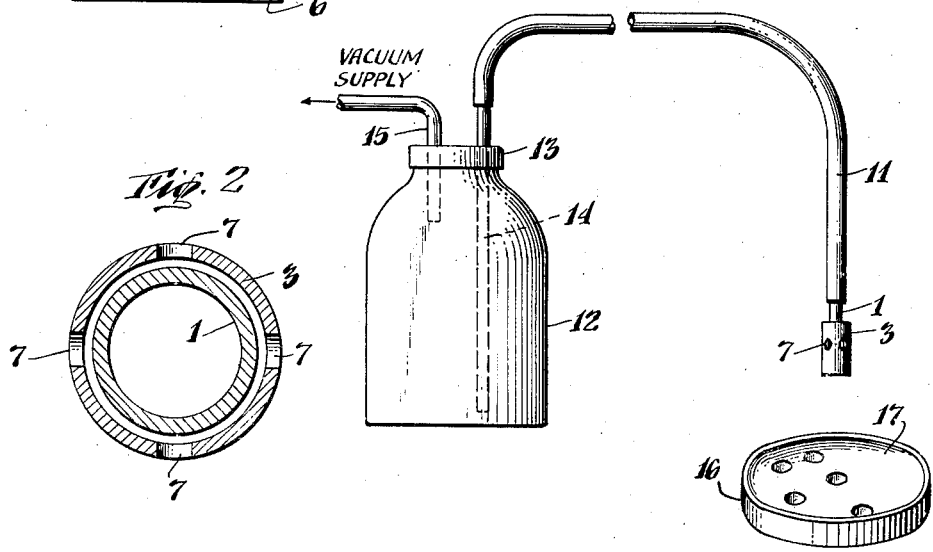
INVENTOR
Morris Dann
BY
ATTORNEY Patented Mar. 1, 1949

2,463,455

UNITED STATES PATENT OFFICE 2,463,455

PUNCH FOR SEMISOLID MEDIA

Morris Dann, Philadelphia, Pa., assignor to Wyeth Incorporated, Philadelphia, Pa., a corporation of Delaware Application November 21, 1946, Serial No. 711,411

4 Claims. (Cl. 164—32)

This invention relates to a punch for semisolid media and more specifically relates to a punch for making cups in bacterial culture media in order to conduct tests for potency of bacterial inhibitory substances.

In carrying out tests for potency of bacterial inhibitory substances such as tyrothrycin, depressions or cups are made in agar, gelatine or similar bacterial culture media, previously inoculated with test organisms, following which appropriate concentrations of the bacterial inhibitory substances being tested are introduced into the depressions or cups. After suitable incubation, the effect of the inhibitory substance is indicated by the area of inhibition around each cup. The diameter of the zone of inhibition has been accepted as the direct measure of the potency of the inhibitory substance. Since variations of 0.25 mm. in zone diameter are significant, it is essential that the initial cup have as nearly perfect cylindrical walls as possible. Moreover, since similar selected amounts of liquid are introduced into each cup, it is obvious that each cup must have similar capacities or volumes and therefore, the depressions or cups must be substantially free of semi-solid medium.

Heretofore these depressions or cups were prepared by means of a Number 6 cork borer. Depressions or cups so derived did not meet the precise requirements necessary for the conduct of the test with satisfactory regularity since the cups were often obtained with ragged edges and elliptical shapes.

In other devices for obtaining depressions or cups, while substantially cylindrical walls can possibly be obtained, the cups made with such devices unavoidably leave some medium within the cups due to the inherent operation caused by their construction. The series of cups produced by such devices have undesirable variable capacities.

An object of the invention is to provide a device for producing depressions or cups in semisolid media which is simple and efficient for the purposes required.

A further object of the invention is to provide a device for producing depressions or cups in bacterial culture media.

A still further object of the invention is to provide a simple but efficient device for producing substantially perfect circular depressions or cups in bacterial culture jells.

Further objects will appear more fully hereinafter.

Referring to the drawings:

Figure 1 is a cross-sectional elevation view of the apparatus of my invention.

Figure 2 is a sectional plan view of the apparatus taken at the line 2—2 in Figure 1.

Figure 3 represents a cross-sectional elevation view of a portion of the apparatus of my invention showing a modification thereof.

Figure 4 represents a view of the apparatus of the invention as employed in connection with a trap and vacuum supply for producing depressions or cups in a jell within a petri dish.

Similar elements are designated by similar numerals in the separate figures.

Referring to Figure 1, numeral 1 indicates a cylinder or tube with an edge 2 at the bottom. Surrounding the tube 1 is a second tube 3 which closely fits tube 1 at the upper portion 4 and is spaced from tube 1 for the remainder of its length, said space or passageway being represented by numeral 5. The lower end of tube 3 is provided with a smooth cutting edge 6. The lower edge 6 of tube 3 extends beyond the edge of tube 1 and the vertical distance between the edges 2 and 6 is generally adjusted to correspond roughly to the depth of jell to be removed. It has been found that the best results are achieved when edge 2 of tube 1 just penetrates the surface of the jell.

The tube 3 is also provided with a series of openings or ports 7, and it has been found that at least two ports should be provided for good operation and preferably four, as shown in Figure 2.

As stated above, the tube 3 should closely fit tube 1 at its upper end as indicated at 4, and may be soldered as shown at 8 if a permanent connection is desired, or tube 3 may threadedly engage tube 1 as shown in Figure 3.

Figure 3 discloses a modification of Figure 1 wherein the tube 1 is provided with a shoulder 9' and is threaded as shown at 9. Tube 3 is provided with a corresponding thread 10 along the interior of portion 4 so that tube 3 may engage tube 1 as shown. The advantage of this form of the invention is that the tubes 1 and 3 can be adjusted to provide the desired spacing between edges 2 and 6 and furthermore, the tubes are easily separated for cleaning or sterilization.

Turning now to the actual method of using the device, Fig. 4 discloses the punch connected at the upper end of 1 to a flexible tube 11 which may preferably be either of rubber or rubber-like material. The tube 11 is connected in turn to a trap shown generally at 12 having a closure 13 holding two tubes 14 and 15, tube 14 extending nearly to the bottom of the trap 12 and connected to tube 11. The shorter tube 15 is in turn connected to a vacuum supply. A petri dish shown at 16 contains a layer 17 of a bacterial medium such as agar.

With the vacuum supply connected to tube 15 as shown, the punch is pressed down into the agar or other semi-solid medium with edge 2 just below the agar surface. With the vacuum obtained via tubes 15, 14, 11 and 1, and air at atmospheric pressure admitted through ports 7, entering passageway 5 and passing around the lower end of tube 1, a pressure differential between passageway 5 and the interior of tube 1 is created which forces the cut-out plug of medium upwardly through tubes 1, 11 and 14 into the trap 12.

The absence of any obstructions between tubes 1 and 3 at their lower ends insures an even application of pressure in the annular passageway between the wall of tube 3 and the end 2 of tube 1 and along the full length of tube 3, and thus results in a clean removal of medium within the area encompassed by tube 3. In this manner a series of depressions or cups are simply and cleanly cut out in the bacterial medium, each cup being substantially a perfect cylinder.

The tubes 1 and 3 may be made of any material adaptable to the purpose desired. Thus the tubes may be either of brass, stainless steel, plastic composition or similar material. While the drawings disclose an inwardly beveled cutting edge, such a cutting edge is not a necessity, the only requirement being that the cutting end of tube 3 be ground to a sharp, smooth cutting edge. While the end 2 of tube 1 has been shown preferentially as also having a sharp cutting edge to facilitate clean removal of the plug of semi-solid media, a cutting edge at the end of tube 1 is not of primary importance and the tube 1 may merely be provided with a relatively thin wall at its lower end.

It may also be noted that the tube 1 is not required to have a uniform diameter throughout its length. The upper portion of tube 1 should be so dimensioned as to permit connection with a flexible tubing such as shown for illustrative purposes at 11 while the remainder of the tube may have a similar or greater diameter as desired. The diameter of the outer cylinder or tube 3, particularly at the cutting edge is selected with regard to the diameter of depression or cup desired in the bacterial medium.

Many modifications of my invention will occur to those skilled in the art without departing from the spirit or scope of the invention and such modifications are contemplated within the scope of the claims.

What I claim is:

1. A device for producing cups in semi-solid media, comprising a tube having a substantially smooth cutting edge adapted for cutting semi-solid media, ports in said tube, a second tube within said first tube having a lower end adjacent and above the cutting edge of said first tube, said tubes being spaced from each other at their lower ends to provide an annular, unobstructed passageway between the cutting edge of said first tube and the lower end of said second tube and said ports communicating with said passageway.

2. A device for producing cups in semi-solid media comprising a tube adapted for connection at an upper end to a zone of lower pressure, a second outer tube surrounding said first tube and spaced therefrom for a portion of its length to provide a passageway between said first and second tubes, ports in said second tube communicating with said passageway, a cutting edge at the lower end of said second tube, said cutting edge extending beyond the lower end of said inner tube, the lower ends of said tubes being unobstructed, thereby permitting clean separation and removal of a plug of semi-solid medium upon a reduction in pressure within the inner tube.

3. A device for producing cups in semi-solid media comprising a tube adapted for connection at an upper end to a zone of lower pressure, a second outer tube surrounding said first tube and spaced therefrom for a portion of its length to provide a passageway between said first and second tubes, ports in said second tube communicating with said passageway, cutting edges at the lower ends of said tubes, the edge of said outer tube extending beyond the edge of said inner tube, the lower ends of said tubes being unobstructed, thereby permitting clean separation and removal of a plug of semi-solid medium upon a reduction in pressure within the inner tube.

4. A device for producing cups in semi-solid media comprising a tube adapted for connection at an upper end to a zone of lower pressure, a second outer tube detachably connected to and surrounding said first tube and spaced therefrom for a portion of its length to provide a passageway between said first and second tubes, ports in said second tube communicating with said passageway, cutting edges at the lower ends of said tubes, the edge of said outer tube extending beyond the edge of said inner tube, the lower ends of said tubes being unobstructed, thereby permitting clean separation and removal of a plug of semi-solid medium upon a reduction in pressure within the inner tube.

MORRIS DANN.

REFERENCES CITED

The following references are of record in the file of this patent:

UNITED STATES PATENTS

| Number | Name | Date |
| --- | --- | --- |
| 1,413,277 | Inglis | Apr. 18, 1922 |
| 1,493,457 | Wright | May 6, 1924 |

FOREIGN PATENTS

| Number | Country | Date |
| --- | --- | --- |
| 152,182 | Germany | June 6, 1904 |